(12) United States Patent
Hong

(10) Patent No.: US 8,580,421 B2
(45) Date of Patent: Nov. 12, 2013

(54) BATTERY PACK

(75) Inventor: Jin-Tae Hong, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 194 days.

(21) Appl. No.: 13/168,130

(22) Filed: Jun. 24, 2011

(65) Prior Publication Data

US 2012/0129027 A1    May 24, 2012

(30) Foreign Application Priority Data

Nov. 23, 2010    (KR) .................. 10-2010-0116855

(51) Int. Cl.
*H01M 2/02*    (2006.01)
*H01M 2/10*    (2006.01)

(52) U.S. Cl.
USPC .......................................... 429/151; 429/100

(58) Field of Classification Search
USPC .................................................. 429/100, 151
See application file for complete search history.

(56) References Cited

U.S. PATENT DOCUMENTS

| 7,915,861 B2 * | 3/2011 | Tsai ............................... 320/132 |
| 2009/0286145 A1 * | 11/2009 | Wan et al. ..................... 429/100 |
| 2010/0075216 A1 * | 3/2010 | Yoo ................................ 429/151 |

FOREIGN PATENT DOCUMENTS

| JP | 2008-245385 A | 10/2008 |
| JP | 2010-050406 A | 3/2010 |
| KR | 100222999 | 7/1999 |
| KR | 2008-0025424 | 3/2008 |
| KR | 100863798 B1 | 10/2008 |
| KR | 2010-0033041 | 3/2010 |

OTHER PUBLICATIONS

Office Action dated Apr. 13, 2010 for corresponding KR Application No. 10-2010-0116855.
Office Action dated Feb. 28, 2013 for corresponding KR Application No. 10-2010-0116855.

* cited by examiner

*Primary Examiner* — Tracy Dove
(74) *Attorney, Agent, or Firm* — Knobbe, Martens, Olson & Bear, LLP

(57) ABSTRACT

The present invention relates to a battery pack and the battery pack includes: a plurality of secondary batteries; a core pack including a protection circuit module; and a battery case composed of first and second sub-cases for accommodating the core pack, in which fastening portions combining the first sub-case with the second sub-case are formed, and adhesive members and grooves receiving the adhesive members are formed at the fastening portions.

20 Claims, 5 Drawing Sheets

BATTERY PACK

CROSS-REFERENCE TO RELATED APPLICATION

This application claims priority to and the benefit of Korean Patent Application No. 10-2010-0116855, filed on Nov. 23, 2010, in the Korean Intellectual Property Office, the entire content of which is incorporated herein by reference.

BACKGROUND

1. Field of the Invention

The present invention relates to a battery pack, in more detail, a battery pack composed of a plurality of secondary batteries.

2. Description of the Related Art

Secondary batteries can vary in their use in accordance with the external electronic devices being used with the secondary batteries.

For example, when the external electronic device requires a high-power power source, a plurality of secondary batteries can be formed in one battery pack product.

The battery pack having this configuration may include one or more cases accommodating the secondary batteries. The shape of the cases may be implemented in various ways, depending on the external electronic devices being used with the battery pack.

SUMMARY OF THE INVENTION

It is an object of the present invention to provide a battery pack that has good external quality and where the strength of the cases is improved.

Further, it is another object of the present invention to provide a battery pack that can more securely couple with an external electronic device that uses the battery pack.

Further, it is another object of the present invention to provide a pack that can be manufactured more efficiently by reducing defects in the manufacturing process of the battery pack.

In order to achieve the objects, the present invention provides the following battery pack.

According to an embodiment of the present invention, a battery pack includes: a plurality of secondary batteries; a core pack including a protection circuit module; and a battery case composed of first and second sub-cases for accommodating the core pack, in which fastening portions combining the first sub-case with the second sub-case are formed, and adhesive members and grooves receiving the adhesive members are formed at the fastening portions.

The core pack may be composed of a plurality of secondary packs electrically connected thereto and one protection circuit module provided in the secondary batteries.

The core pack may have a connector for electric connection with the outside, and at least any one of the first sub-case and the second sub-case may further haves a connector seat that exposes the connector to the outside.

The fastening portion may include a receiving portion that receives the extending portion, the extending portion is formed at the first sub-case, and the receiving portion may be formed at the second sub-case. The extending portion may have one or more fastening protrusions or fastening grooves and the receiving portion may have one or more fastening grooves or fastening protrusions at the positions corresponding to the fastening protrusions or the fastening grooves of the extending portion, such that the first and second sub-cases can be combined. The adhesive member may be disposed at the portion where the extending portion and the receiving portion are in contact with each other, at the fastening portion. Further, the groove may be formed in the extending portion, where the extending portion and the receiving portion are in contact with each other, at the fastening portion.

At least any one of the first and second sub-cases may further have a coupling member that combines an external electronic device with the battery pack. The coupling member may be disposed at the fastening portion of the battery case. A groove may be further formed in the extending portion or the receiving portion, at the fastening portion with the coupling member. Further, the coupling member may be manually operated for combination with the external electronic device. The coupling member may have an adjusting portion and a hooking portion, and as the adjusting portion is manually operated, the hooking portion is correspondingly moved, such that the external electronic device can be coupled. It is preferable that the coupling member is a latch.

The adhesive member may be any one of glue, silicon, and epoxy.

The secondary batteries may be cylindrical or polygonal secondary batteries.

The battery pack according to the present invention is composed of the first and second sub-cases and the first and second sub-cases are firmly combined. Therefore, the battery pack according to the present invention is not easily broken by external shock.

Further, the battery pack according to the present invention has a groove at the position where the adhesive member is disposed, when the adhesive member is used to combine the first and second sub-cases. The groove inhibits the adhesive member from flowing outside resulting in an excessive adhesive member. Therefore, the external appearance of the battery pack is not negatively affected.

Further, the battery pack according to the present invention may further include a latch for firm combination of an external electronic device using the battery pack. A groove receiving the excessive adhesive member may be formed at the portion where the latch is disposed. Therefore, it is possible to inhibit the adhesive member from leaking to the latch and causing non-operation of the latch.

Further, the battery pack according to the present invention can inhibit defects frequently caused in the latter process of manufacturing the battery pack. Therefore, it is possible to improve productivity and process efficiency of the manufacture of the battery pack.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION OF THE INVENTION

Figure 1:
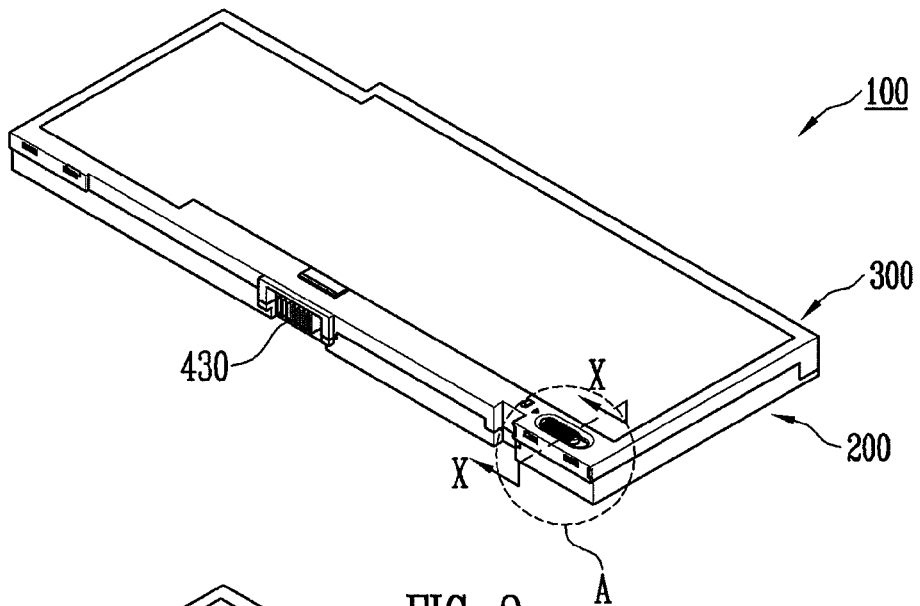
FIG. 1 is an assembled perspective view showing a battery pack according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Embodiments of the present invention and other information for those skilled in the art to easily understand the present invention are described hereafter in detail with the accompanying drawings. However, the present invention may be changed and modified in various ways within the scope described in claims; therefore, it can be understood by those skilled in the art that the embodiment described below are just exemplified.

When it is determined that detailed descriptions for well-known technologies may unnecessarily make the point of the present invention unclear, the detailed descriptions are not provided, in explaining the present invention. Further, eve if the same components are shown in different figures of the drawings, it should be noted that they are represented by as the same reference numerals or characters as possible. In addition, the size or thickness may be exaggerated or reduced in the drawings for the convenience of description and clarity, and may be different from the thickness or size of the actual layers.

The present invention is described hereafter in detail with reference to the drawings.

Hereinafter, a battery pack according to an embodiment of the present invention is described with reference to FIGS. 1 to 5C.

Figure 2:
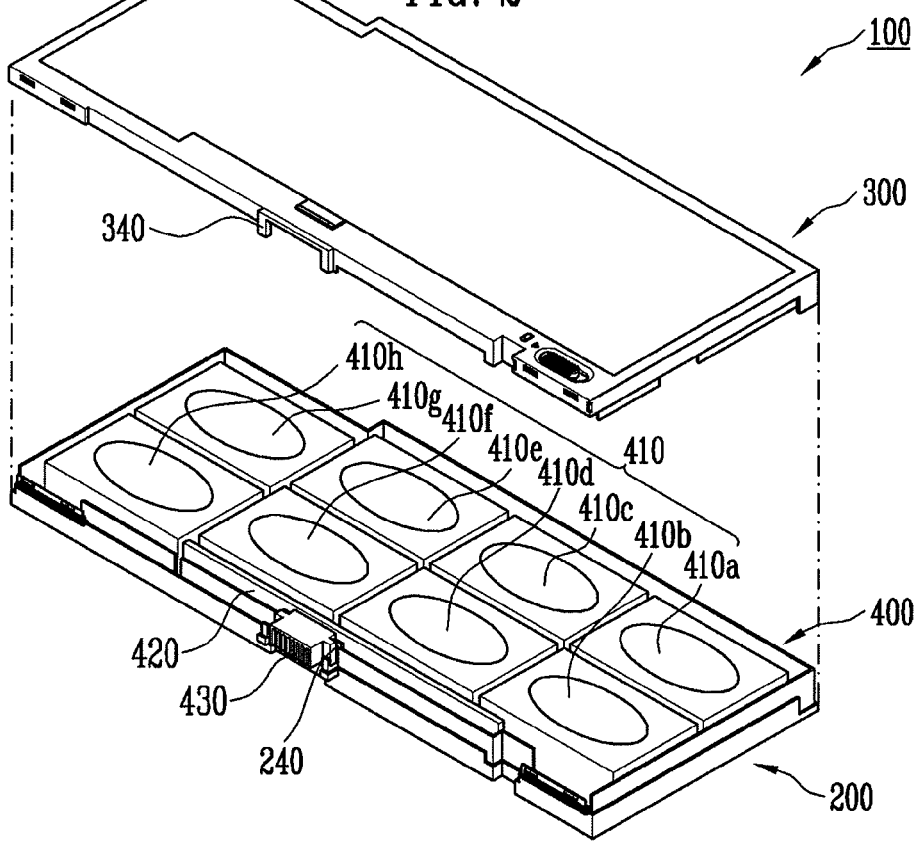
FIG. 2 is an exploded perspective view showing a battery pack according to an embodiment of the present invention.
Figure 3A:
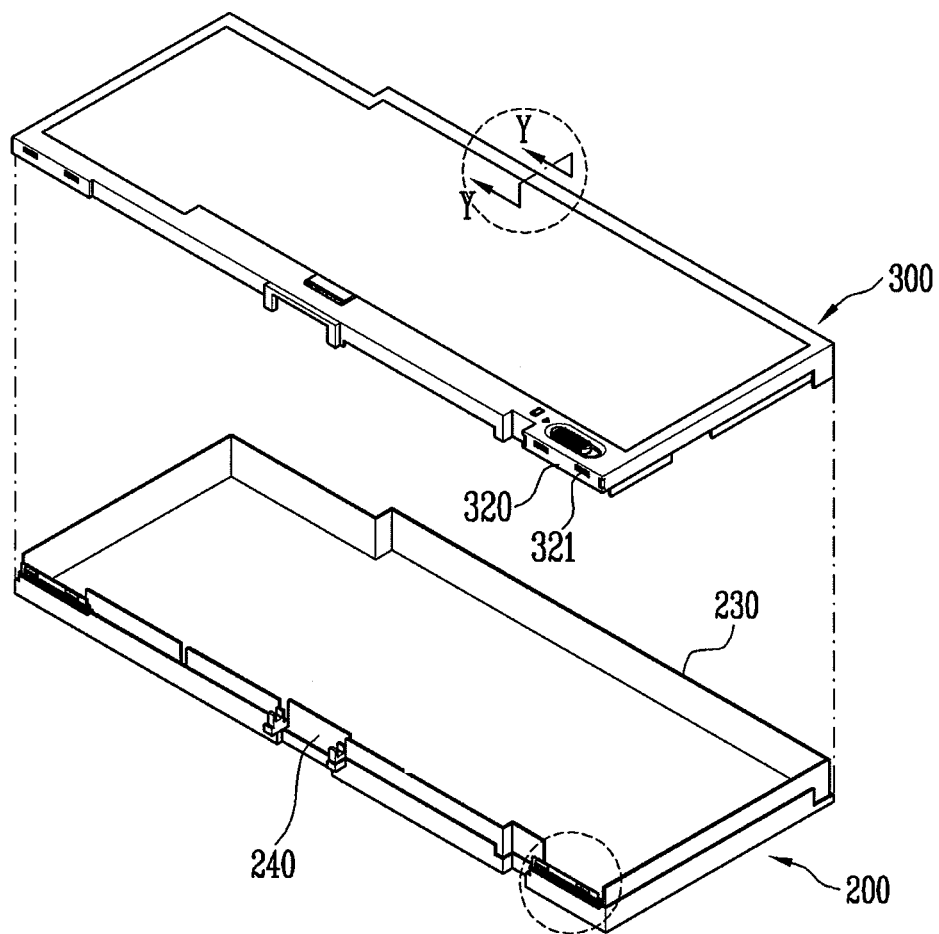
FIG. 3A is an exploded perspective view showing a battery pack case according to an embodiment of the present invention.
Figure 3B:
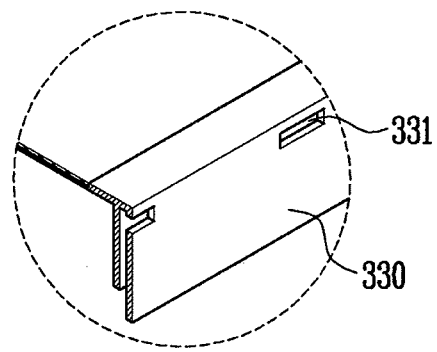
FIG. 3B is a cross-sectional view taken along the line Y-Y of FIG. 3A.
Figure 4:
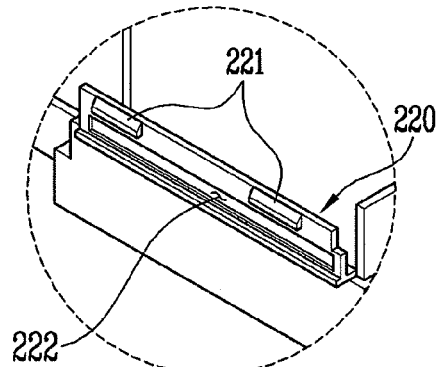
FIG. 4 is an enlarged view of the portion B shown in FIG. 3A.
Figure 5A:
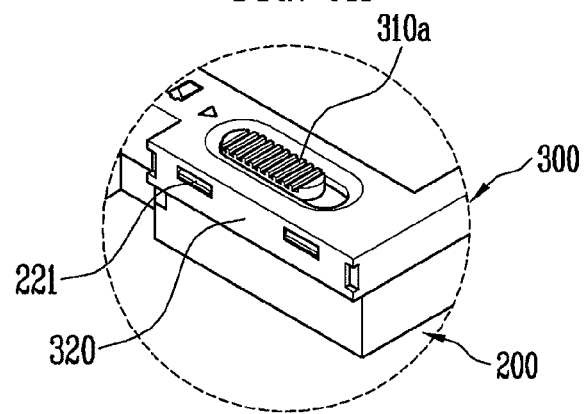
FIG. 5A is an enlarged view of the portion A shown in FIG. 1.
Figure 5B:
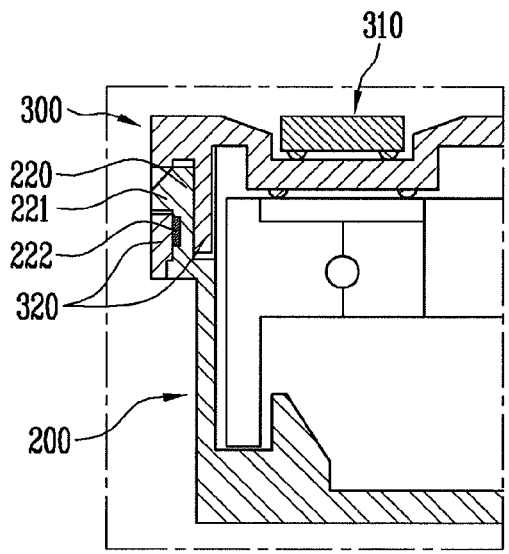
FIG. 5B is a cross-sectional view taken along the line X-X of FIG. 1.
Figure 5C:
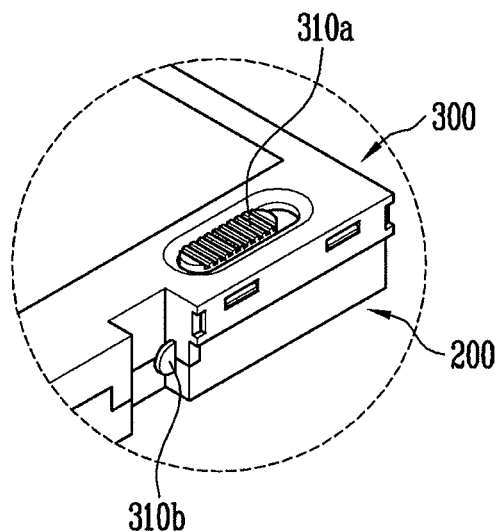
FIG. 5C is a side view showing the portion A shown in FIG. 1.

FIGS. 1 and 2 are an assembled perspective view and an exploded perspective view of a battery pack according to an embodiment of the present invention. FIG. 3A is an exploded perspective view of the battery pack according to an embodiment of the present invention and FIG. 3B is a cross-sectional view taken along the line Y-Y of FIG. 3A. FIG. 4 is a partially enlarged view of the portion B shown in FIG. 3. FIG. 5A is an enlarged view showing the portion A shown in FIG. 1, FIG. 5B is a cross-sectional view taken along the line X-X of FIG. 1, and FIG. 5C is a side view showing the portion A shown in FIG. 1.

Referring to FIGS. 1 and 2, a battery pack 100 according to an embodiment of the present invention includes a core pack 400 and a battery case composed of first and second sub-cases 200, 300 to accommodate the core pack 400.

First, the core pack 400 in the battery pack 100 is composed of a plurality of secondary batteries 410, a protection circuit module 420, and a connector 430.

The secondary batteries 410 are each formed by filling a can having an opening with an electrolyte and an electrode assembly, and then closing the opening of the can with a cap assembly. The electrode assembly is formed by winding an anode plate, a cathode plate, and a separator interposed between the electrode plates. In this configuration, electrode taps are attached to the anode plate and the cathode plate and the plates are electrically connected to the outside by the electrode taps. Cathode pins on the top of the secondary batteries 410 function as cathode terminals and the cans of the secondary batteries 410 function as anode electrodes, but the present invention is not limited thereto. Energy produced by electrochemical reaction between the electrode assembly and the electrolyte is transmitted to an external electronic device.

Although eight hexahedral secondary batteries 410 are shown in this embodiment, this may be changed in accordance with the design of the battery pack 100. That is, the number of the secondary batteries 410 may be eight or more or less, and the secondary batteries 410 may have a circular or pouch shape.

The secondary batteries 410 are composed of first to eighth secondary batteries 410a, 410b, 410c, 410d, 410e, 410f, 410g, and 410h, and the secondary batteries 410a, 410b, 410c, 410d, 410e, 410f, 410g, and 410h are electrically connected together. Further, tapes are attached to the long sides of the first to eighth secondary batteries 410a, 410b, 410c, 410d, 410e, 410f, 410g, and 410h and substantially circular through-holes are formed in the tapes. The through holes are for compensating the increase in thickness of the center portion by swelling when the secondary batteries 410 are charged/discharged.

The first secondary battery 410a is connected in parallel with the second secondary battery 410b, which is a first set, the third secondary battery 410c is connected in parallel with the fourth secondary battery 410e, which is a second set, the fifth secondary battery 410e is connected in parallel with the sixth secondary battery 410f, which is a third set, and the seventh secondary battery 410g is connected in parallel with the eighth secondary battery 410h, which is a fourth set. In this configuration, the first to fourth sets are connected in series. This structure is called 4S2P (4 series-2 parallel) for the convenience. Although the 4S2P structure is shown in this embodiment, the configuration of the second batteries 410 may be changed in various ways in accordance with the battery pack 100.

As described above, the secondary batteries 410 that are connected in this way may be provided with a protection circuit module 420. The protection circuit module 420 may include a protection circuit substrate having a conductive metal pattern therein, a protection circuit device, and the connector 430. The protection circuit module 420 controls the charging/discharging, current, voltage, and temperature of the secondary batteries 410.

The connector 430 is attached to the protection circuit module 420, toward the outside. The connector 430 is exposed to the outside through connector seats 240, 340 formed at the first and second sub-cases 200, 300. As described above, the connector 430 exposed to the outside is connected to an external electronic device and functions as a path for supplying power.

As described above, the core pack 400 includes the secondary batteries 410, the protection circuit module 420 electrically connected with the secondary batteries, and the connector 430. The core pack 400 is accommodated in the battery case to form the battery pack 100.

Hereinafter, the battery case according to this embodiment is described with reference to FIGS. 3A and 3B.

The battery case of this embodiment is composed of the first sub-case 200 and the second sub-case 300.

The first sub-case 200 is a hexahedron with one surface open to accommodate the core pack. The first sub-case 200 has the connector seat 240 where the connector 430 of the core pack is seated. It is preferable that the connector seat 240 corresponds to the shape of the connector. As described above, the connector is exposed to the outside through the connector seat 240. Further, the first sub-case 200 has one or more fastening portions that are coupled to the second sub-case 300.

The second sub-case 300 is also a hexahedron with one side open. It is preferable that the open side of the second sub-case 300 corresponds to the open side of the first sub-case 200. Further, the second sub-case 300 may have also a connector seat 340 where the connector of the core pack is seated. When one battery case is formed by combining the first and second sub-cases 200, 300, the connector seats 240, 340 of the first and second sub-cases 200, 300 are combined, thereby forming one opening. The connector 430 is exposed to the outside through the opening formed as described above.

The opening has only to expose the connector 430, such that the shape of the connector seats 240, 340 is not limited to what is shown in this embodiment. In one implementation, the connector seats 240, 340 has a shape exactly fitting to the connector 430 in order to fix the connector and inhibit the connector from moving in the battery case, and to inhibit foreign substances from flowing into the battery case.

For the convenience of the description, the side where the connector seats 240, 340 are formed is referred to as a first side and the side corresponding to the first side is referred to as a second side, in the first and second sub-cases 200, 300. The first and second sub-cases 200, 300 can be combined by the fastening portions at the first or second side. Further, the first and second cases 200, 300 may be further firmly combined by an additional adhesive member. The fastening portions of the first and second sub-cases 200, 300 are divided into first fastening portions formed at the first side and second fastening portions formed at the second side.

The first fastening portion is described with reference to FIGS. 3A to 5C.

Referring to FIG. 3A, the first fastening portion is formed at both ends of the first side of the first and second sub-cases 200, 300. The first fastening portion is composed of a first extending portion 220 (FIG. 4) and a first receiving portion 320 (FIG. 5A). The first extending portion 220 is received in the first receiving portion 320 and combines the first and second sub-cases 200, 300. The first extending portion 220 maybe stepped with respect to the inner side of the first sub-case 200. Further, the first extending portion 220 may further have one or more fastening protrusions 221. In this configuration, the first receiving portion 320 may further have one or more fastening grooves or openings 321 at the positions corresponding to the fastening protrusions 221. When the first extending portions 200 are received in the first receiving portions 320, the fastening portion 221 are inserted in the fastening grooves 321, such that the first and second sub-cases 200, 300 are more firmly connected.

Referring to FIG. 4, the first extending portion 220 may further have a groove 222, which is a long extending groove. Further, referring to FIGS. 5A and 5C, the battery pack 100 may further have a coupling member 310 at one end. The coupling member 310 reinforces the connection to an external electronic device using the battery pack 100. For example, a latch may be the coupling member 310.

The coupling member 310 may have an adjusting portion 310a shown in FIG. 5A and a hooking portion 310b shown in FIG. 5C. As the adjusting portion 310a is moved left and right, the hooking portion 310b moves, corresponding to the adjusting portion 310a. The function of the coupling member 310 is now described in detail. In a normal state without force, the adjusting portion 310a is biased at the left side while the hooking portion 310b protrudes outside the battery case, as shown in FIG. 5C. In this position, as the adjusting portion 310a is moved to the right by force, the hooking portion 310b protruding outside is moved into the battery case. Accordingly, the hooking portion 310b can be inserted into a groove of the external electronic device, such that the battery pack 100 and the external electronic device are combined. Therefore, the battery pack 100 can be more securely combined with the external electronic device.

The first extending portions 220 of the first sub-case 200 are inserted in the first receiving portions 320 of the second sub-case 300, such that the first and second sub-cases 200, 300 are combined. In this configuration, an adhesive member may be further provided at the first fastening portion in order to more firmly connect the first and second sub-cases 200, 300. For example, the adhesive member may include any one or more of glue, silicon, and epoxy. Preferably, the adhesive member is glue.

In general, the adhesive member is a material having fluidity. The adhesive member may be disposed at least any one of the first extending portions 220 and the first receiving portions 320 of the first sub-case 200 or the second sub-case 300. In this configuration, when the amount of the adhesive disposed at the first fastening portion is excessive, the adhesive may detract from the external appearance by flowing outside the first and second sub-cases 200, 300. If excessive, the adhesive may flow to the coupling member 310. Therefore, the coupling member 310 may not be able to move, such that the function of combining the battery pack 100 with the external electronic device may be inhibited.

The battery pack 100 according to this embodiment may further include the groove 222 adjacent any one of the first extending portions 220 and the first receiving portions 320. The groove 222 is positioned where the first extending portion 220 and the first receiving portions 320 are in contact with each other. Preferably, the groove 222 is formed at the first extending portions 220, as shown in FIG. 4. Hereinafter, the first extending portions 220 and the first receiving portions 320 are described before the grooves 222 are described.

Referring to FIG. 4, the first extending portion 220 has a substantially rectangular cross-section and is formed in a hexahedron extending along the first side. Therefore, the first extending portion 220 extends lengthwise along the inner side of the first sub-case 200. Further, the first extending portion 220 may further have one or more fastening protrusions 221.

In this embodiment, the first fastening portion and the second fastening portion are formed in the same configuration. Therefore, the first receiving portion 320 is described with reference to the second receiving portion 330 shown in FIGS. 3A and 3B. The first receiving portion 320 receives the first extending portion 220. Therefore, it is preferable that the first receiving portion 320 corresponds to the first extending portion 220. For example, as described above, since the first extending portion has the rectangular cross-section and is a hexahedron with one long side, the first receiving portion 320 has a shape corresponding to the first extending portion 220 to receive the first extending portion 220.

Further, the first receiving portion 320 may further have fastening grooves 321 where the one or more fastening protrusions 221 at the first receiving portion 220 are inserted. It is preferable that the fastening grooves 321 correspond to the fastening protrusions 221. Referring to FIG. 5A, the first extending portion 220 of the first sub-case 200 is inserted in contact with the first receiving portion 320 of the second sub-case 300 while the fastening protrusion 221 of the first extending portion 220 is inserted in the fastening groove 321 of the first receiving portion 320.

As described above, the adhesive member may be further disposed at the first fastening portion, which may be a factor causing defects in the battery pack 100 when excessive adhesive member is used. Referring to FIG. 5B, the adhesive member is attached to the portion where the groove 222 of the first extending portion 220 is formed. The groove 222 is formed where the adhesive member is disposed and receives the adhesive member. Therefore, even if excessive adhesive member is used, the adhesive member does not flow outside, because it is received in the groove 222. That is, the battery pack 100 according to this embodiment is less likely to have problems, such as a defect external appearance or non-operation of the coupling member, even if excessive adhesive member is provided.

In FIG. 4, the groove 222 extends under the fastening protrusion 221. As described above, the groove 222 receives the adhesive member, which can be disposed at the fastening portion, and inhibits the adhesive member from leaking, such that the position and the shape of the groove 222 are not limited. Further, the groove 222 may be formed at any position for fastening by using the adhesive member.

Hereinafter, the second fastening portions formed at the second sides of the first and second sub-cases 200, 300 are described. Similar to the first side, the second fastening portion may be formed at the second side to firmly combine the first and second sub-cases 200, 300.

Referring to FIGS. 3A and 3B, the second fastening portion is composed of the second extending portion 230 formed at the first sub-case 200 and the second receiving portion 330 which defines a channel is formed at the second sub-case 300. The channel receives the second extending portion 230. Further, a fastening protrusion (not shown) is formed at the second extending portion 230 and a fastening groove 331 corresponding to the fastening protrusion is formed at the second receiving portion 330. When the first and second sub-cases 200, 300 are combined, the second extending portions are inserted in the channel of the second receiving portions 330. In this position, the fastening protrusions are inserted in the fastening grooves 331. The second fastening portion formed at the second side is the same as the first fastening portion described above and the detailed description is not provided.

The first and second fastening portions are provided to firmly assemble the battery case. Therefore, the position and shape of the fastening portions may be changed in accordance with the design of the battery case and are not limited to those described above. Further, the receiving portions and extending portions of the fastening portions have only to correspond to the first or second sub-case, such that the position and shape may be appropriately changed.

Hereinafter, a battery pack according to another embodiment of the present invention is described with reference to FIGS. 6 to 8.

Figure 6:
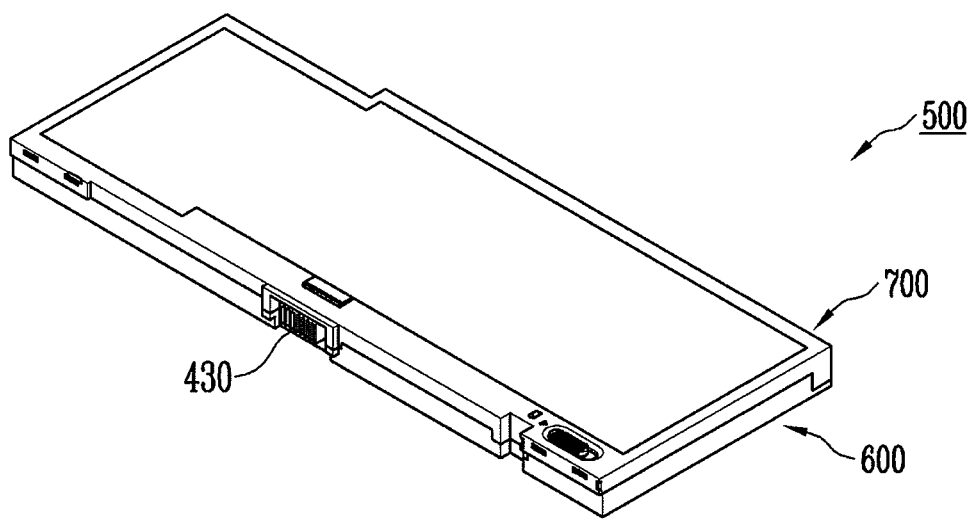
FIG. 6 is an assembled perspective view showing a battery pack according to another embodiment of the present invention.
Figure 7:
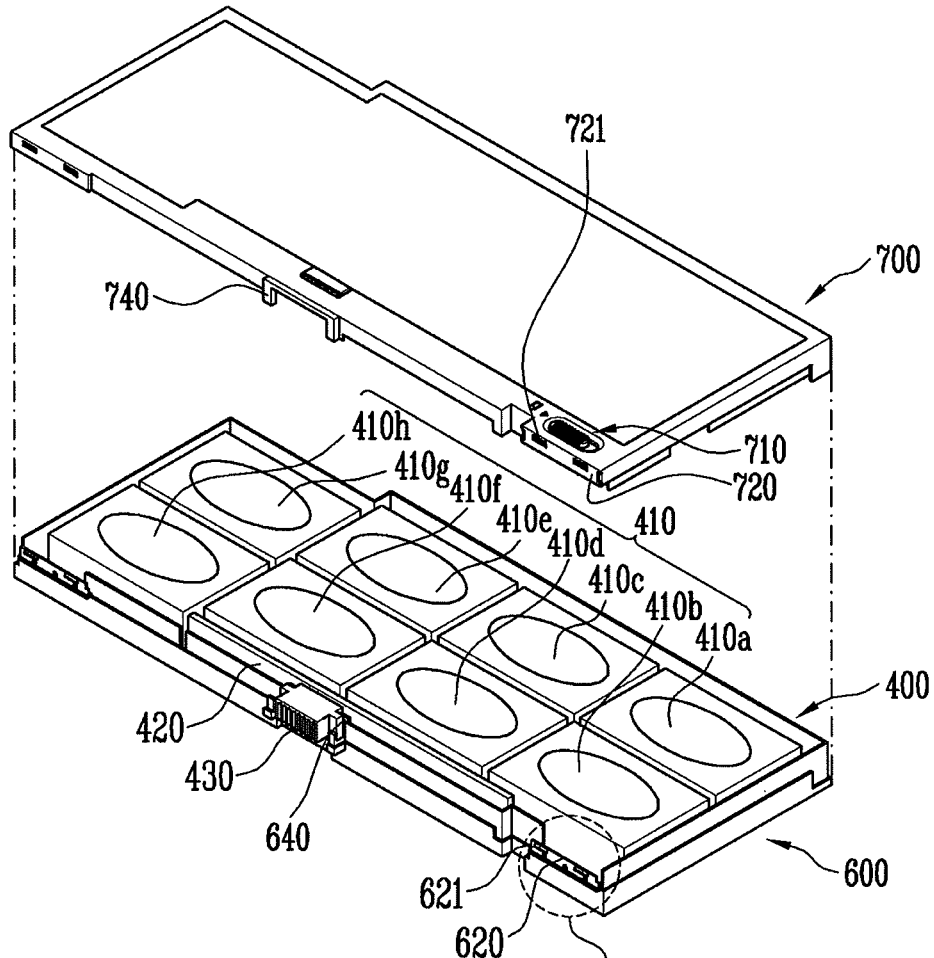
FIG. 7 is an exploded perspective view showing a battery pack according to another embodiment of the present invention.

FIGS. 6 and 7 are an assembled perspective view and an exploded perspective view of a battery pack according to another embodiment of the present invention. FIG. 8 is an enlarged view of the portion C shown in FIG. 7.

A battery pack 500 according to this embodiment includes a core pack 400 and a battery case composed of first and second sub-cases 600, 700 to accommodate the core pack 400. The battery pack 200 according to this embodiment has the core pack 400 that is the same as the core pack 400 of the battery pack 100 described in the above embodiment, such that the detailed description of the core pack 400 is not provided. Hereafter, the first and second sub-cases 600, 700 of this embodiment are described.

Referring to FIG. 7, the first sub-case 600 is a substantial hexahedron with one side open. Further, the second sub-case 700 is also a hexahedron with one side open corresponding to the open side of the first sub-case 600. The battery pack 500 according to this embodiment can be manufactured by coupling the second sub-case 700 to the first sub-case 600 accommodating the core pack 400.

The first and second sub-cases 600, 700 may have connector seats 640, 740 where a connector 430 formed at the core pack 400 can be seated. The connector 430 is exposed to the outside through the connector seats 640, 740 and functions as a path for supplying power to an external electronic device using the battery pack 500.

Fastening portions may be formed at the first side (the surface where the connector seats are formed in the figure) and the second side (the surface corresponding to the first side) of the battery pack 500 according to this embodiment. The fastening portions firmly combine the first and second sub-cases 600, 700. Further, the fastening portions of the first and second sub-cases 600, 700 have the same configuration and function as the embodiment described above, such that the detailed description is not provided.

Referring to FIG. 7, the battery pack 500 may be provided with a movable coupling member 710. Further, the first and second sub-cases 600, 700 can be combined where the coupling member 710 is disposed. That is, the first sub-case 600 has first extending portions 620 and the first extending portions 620 are received in first receiving portions 720 of the second sub-case 700. Further, the first extending portion 620 has a fastening protrusion 621, which is inserted in a fastening grooves formed at the first receiving portion 720. In this configuration, the battery pack 500 may further have adhesive members where the first extending portions 620 and the second receiving portions are in contact. For example, the adhesive member may include any one or more of glue, silicon, and epoxy. Preferably, the adhesive member is glue. In general, the adhesive member is fluid and there is little space between the first extending portion 620 and the second receiving portion 720. Therefore, when excessive adhesive member is used, the adhesive member may leak. Therefore, it may detract from the external appearance or cause non-operation of the coupling member.

Figure 8:
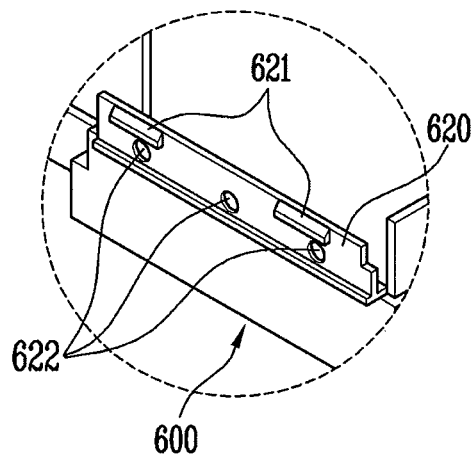
FIG. 8 is an enlarged view of the portion C shown in FIG. 7.

Referring to FIG. 8, the first extending portion 620 may further have a groove 622. The grooves 622 are a plurality of circular grooves spaced apart from each other at a predetermined distance, under the fastening protrusions 621. As described above, the groove 622 receives an excessive adhesive member. That is, even if excessive adhesive member is used, the adhesive member is received in the groove 622. Therefore, since the adhesive member does not flow outside, it is possible to prevent defects, such as detracting from the external appearance and non-operation of the coupling member.

The configuration and operation of the first and second sub-cases 600, 700, other than those described above, are the same as in the first and second sub-cases 200, 300 shown in FIGS. 1 to 5C, such that the detailed description is not provided.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery pack comprising:
    a plurality of secondary batteries;
    a core pack including a protection circuit module; and
    a battery case composed of first and second sub-cases for accommodating the core pack,
    wherein fastening portions combining the first sub-case with the second sub-case are formed, and adhesive members and grooves receiving the adhesive members are formed at the fastening portions wherein the grooves are positioned on the fastening portions and extend inward into the fastening portions so that excess adhesive from the adhesive member is inhibited from flowing out of an interface defined by the fastening portions of the first and second sub-cases.

2. The battery pack according to claim 1, wherein the core pack has a connector for electric connection with the outside, and at least any one of the first sub-case and the second sub-case further has a connector seat that exposes the connector to the outside.

3. The battery pack according to claim 1, wherein the fastening portion includes a receiving portion that receives the extending portion, the extending portion is formed at the first sub-case, and the receiving portion is formed at the second sub-case.

4. The battery pack according to claim 3, wherein the extending portion has one or more fastening protrusions or fastening grooves and the receiving portion has one or more fastening groove or fastening protrusions at the positions corresponding to the fastening protrusions or the fastening grooves of the extending portion, such that the first and second sub-cases are combined.

5. The battery pack according to claim 3, wherein the adhesive member is disposed at the portion where the extending portion and the receiving portion are in contact with each other, at the fastening portion.

6. The battery pack according to claim 3, wherein the groove is formed in the extending portion, where the extending portion and the receiving portion are in contact with each other, at the fastening portion.

7. The battery pack according to claim 1, wherein at least any one of the first and second sub-cases further has a coupling member that combines an external electronic device with the battery pack.

8. The battery pack according to claim 7, wherein the coupling member is disposed at the fastening portion of the battery case.

9. The battery pack according to claim 8, wherein a groove is further formed in the extending portion or the receiving portion, at the fastening portion with the coupling member.

10. The battery pack according to claim 7, wherein the coupling member is manually operated for combination with the external electronic device.

11. The battery pack according to claim 10, wherein the coupling member has an adjusting portion and a hooking portion, and as the adjusting portion is manually operated, the hooking portion is correspondingly moved, such that the external electronic device is coupled.

12. The battery pack according to claim 7, wherein the coupling member is a latch.

13. A battery pack comprising:
    a plurality of secondary batteries;
    a core pack that include a protection circuit module;
    a first sub-case that defines an interior space;
    a second sub-case that defines an interior space, wherein the first and second sub-cases define a battery case and wherein the interior space of the first and second sub-cases receive the plurality of secondary batteries;
    a first interconnection mechanism formed on the first sub-case;
    a second interconnection mechanism formed on the second sub-case, wherein the first and second interconnection mechanisms engage with each other at an interface so as to secure the first and second sub-cases together and wherein an adhesive member is applied at the interface to further interconnect the first and second sub-cases and wherein at least one of the first and second sub-cases includes at least one groove at the interface that is positioned and extends inward into at least one of the first and second sub-cases so that excess adhesive member that is applied between the first and second sub-cases at the interface is inhibited from flowing out of the interface.

14. The battery pack of claim 13, wherein the at least one groove comprises an indentation that extends along a length of at least one of the first or second sub-cases.

15. The battery pack of claim 13, wherein the at least one groove comprises a plurality of through holes extending through at least one of the first or second sub-cases.

16. The battery pack of claim 13, wherein at least any one of the first and second sub-cases further has a coupling member that combines an external electronic device with the battery pack.

17. The battery pack of claim 16, wherein the first and second interconnection mechanisms define a fastening portion of the battery case and wherein the coupling member is positioned at the fastening portion of the battery case.

18. The battery pack of claim 17, wherein the coupling member is manually operated to connect the battery pack with the external electronic device.

19. The battery pack of claim 18, wherein the coupling member has an adjusting portion and a hooking portion and, as the adjusting portion is manually operated, the hooking portion is correspondingly moved such that the external electronic device is coupled to the battery pack.

20. The battery pack of claim 16, wherein the coupling member is a latch.

* * * * *